Sept. 5, 1944.  O. C. MOLL  2,357,754
OUTLET OR JUNCTION BOX
Filed May 15, 1941
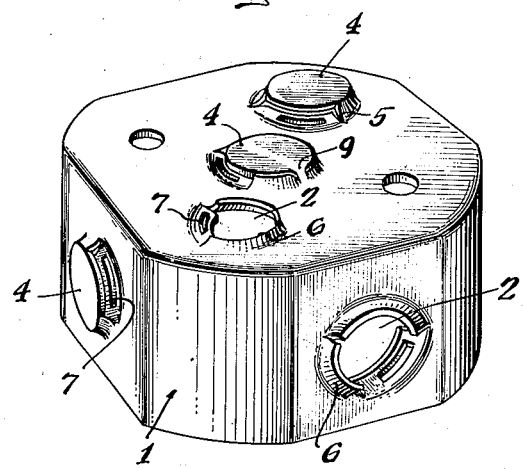
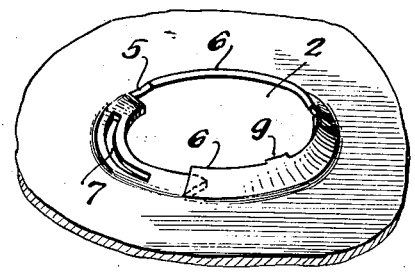
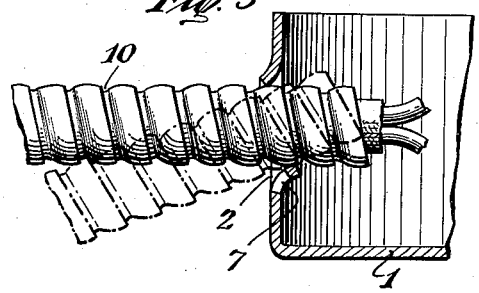
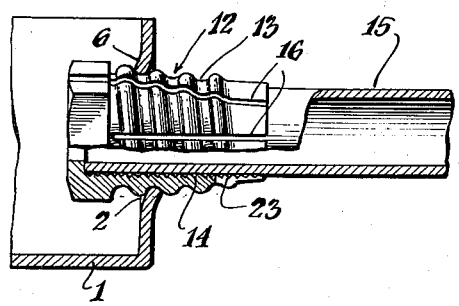
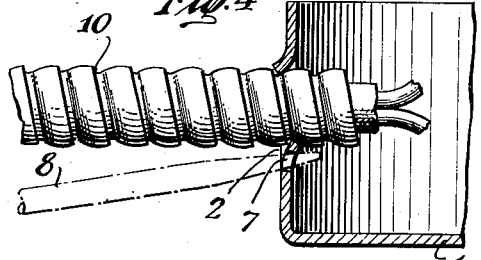
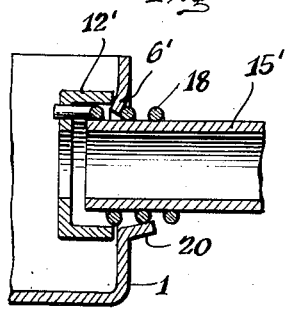
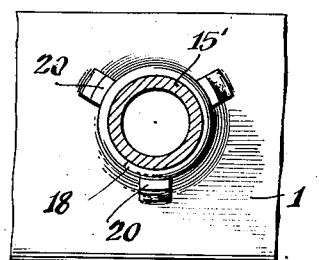
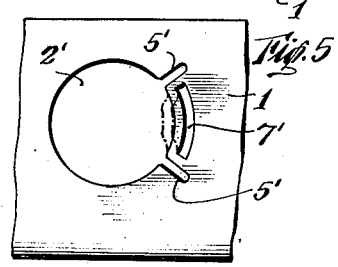
INVENTOR.
Oswin C. Moll
BY Norman L. Holland
ATTORNEY Patented Sept. 5, 1944

2,357,754

UNITED STATES PATENT OFFICE 2,357,754

OUTLET OR JUNCTION BOX

Oswin C. Moll, Manhasset, N. Y.

Application May 15, 1941, Serial No. 393,609

8 Claims. (Cl. 220—3.2)

The present invention relates to electrical devices and more particularly to outlet or junction boxes used in the installation of electrical wiring.

Extreme precaution is required in connection with electrical wiring to prevent short circuits and frequent fires. The insulated wires are usually drawn through conduits, which may be lead or steel pipe or the so-called "BX" type of covering. Whenever it is necessary to break a conduit to make a connection or to splice a cable, the broken portion must be covered. This is usually done by means of an outlet or terminal box. Several types of such boxes are made and sold at the present time. The most common form is a metal box provided with a removable cover and having a series of apertures in the box normally closed by knock-out members. In making a connection within the box, one or more of the knock-out members are first removed, so as to provide the desired aperture, the "BX" cable or wire containing pipe brought through the apertures, and the connections made within the terminal box. The fire underwriters require that the conduits be securely held in position within a terminal box to prevent strain on the connection and also require that the conduits be effectively grounded to the box. The present commercial practice is to utilize a split collar or clamp fitted about the end of the conduit which projects within the terminal box. The collar is provided with tightening screws to lock the conduit in position. In other cases the collar fitting about the conduit is secured to the box itself by one or more screws. The clamping, in either case, requires considerable time on the part of an operator and increases the cost of the installation. Electrical workers are high-paid craftsmen receiving as much as twelve dollars a day in some parts of the United States. Hence, a saving of time is a material saving in cost of installation. In some cases, workmen forget to tighten the clamping screws and the cover of the box has to be removed to remedy the defect. In other cases the fire underwriters are not able to detect the defect since it is hidden from view on the inside of the box.

There is constant complaint among electrical workers and among fire underwriters as to present types of terminal boxes. A demand for something new and more effective has existed for some years. The present invention aims to provide an improved outlet or junction box to which the cables or conduits may be secured with less time and effort and with greater security. This is accomplished by the present invention without increasing the cost of the outlet boxes and without requiring changes in the types of tools which are now used. The security of the connections may be observed from the exterior of the boxes and hence inspection is greatly facilitated and ineffective installations are readily detectable by inspectors.

An object of the present invention is to provide an improved outlet or connector box for use with electrical wiring.

Another object of the invention is to provide apertures in the box, the peripheries of which may be readily bent to lock a cable or conduit in an aperture.

Another object of the invention is to provide knock-out members which may be more easily removed from the apertures.

Another object of the invention is to provide means which are visible from the exterior of the box for securely locking a cable in an aperture.

Another object of the invention is to eliminate the expensive clamps, heretofore used at the interior of a box, for securing cables or conduits in position.

A further object of the invention is to provide means for locking cables or conduits within apertures in instances where the cables vary in size, without requiring a corresponding size of aperture.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a perspective view of a terminal or junction box illustrating a preferred embodiment of the invention, with two of the knock-out members removed.

Fig. 2 is an enlarged perspective view of an improved aperture with a knock-out member removed.

Fig. 3 is a fragmentary sectional view illustrating the preferred method of inserting a cable or conduit into an aperture.

Fig. 4 is a fragmentary sectional view illustrating a preferred method of securing a cable or conduit in an aperture.

Fig. 5 is a top plan view of a modified form of aperture.

Fig. 6 is a fragmentary view, partly in section, showing a modified form of the invention and illustrating a preferred embodiment of means for securing conduits in apertures.

Fig. 7 is a fragmentary sectional view illustrating another modified means of securing a conduit in an aperture, and Fig. 8 is an end view of the modified means shown in Fig. 7.

Referring again to the drawing illustrating a preferred embodiment of the invention, and more particularly to Figs. 1 to 4 thereof, there is shown one type of outlet or junction box 1 having a series of apertures 2 in the walls thereof and a knock-out member 4 secured at the edges of the apertures. In the manufacture of the boxes, all the apertures 2 for receiving cables or conduits have knock-out members 4 secured therein. When an electrician desires to use a box he removes, by means of a screw driver or other device, one or more of the knock-out members to provide apertures through which cables or conduits may be drawn or inserted. The knock-out members of the unused apertures are allowed to remain in position to lessen the chance of fire resulting from defective connections. For purposes of illustration, two of the apertures of Fig. 1 are illustrated with the knock-out members removed.

An enlarged fragmentary perspective view of a preferred form of aperture is shown in Fig. 2. A plurality of outwardly extending slots 5 are shown at the edge of the aperture, forming a plurality of intermediate tongues or tabs 6, here shown as three in number. It will be understood that any desired number may be utilized. The slots 5 facilitate the reformation of the tabs 6. In the preferred embodiment these tabs are bent in opposite directions so that their edges are substantially in the form of a spiral. Preferably one of the tabs 6, in the present instance, the one shown with the slot 7 therein, is inclined downwardly while the other two tabs are inclined upwardly as shown in section in Fig. 3. In this way, the edge of the aperture after the knock-out member 4 is removed, is in substantially the form of a female thread section. There are two advantages in having one or more of the tabs below the plane of the metal and others above it; first, the amount of bending required for a given pitch is less, since part of the pitch of the thread can be accommodated by bending one or more tabs on one side of the plane of the wall and the other portion of the pitch is accommodated by moving one or more tabs on the other side of the plane of the wall, hence, the distance that the parts have to be bent with respect to the plane of a wall is decreased. The second advantage is that the bending or inclination of certain portions outwardly and of other portions inwardly make the effective size of an aperture greater with respect to an inclined axis than with respect to a perpendicular axis. Hence, the cable or conduit 3 may be inclined to the wall of the aperture as shown in Fig. 3 and inserted in the aperture without turning the cable or the box. Thereafter, when the cable 3 is raised to its perpendicular position, it will, to some extent, be in interlocking engagement. A screw driver 8 or other suitably pointed instrument may be inserted in the apertures 7 to bend the slotted tab substantially into the plane of the wall of the box. This, in effect, reduces the size of the aperture, and at the same time, locks the cable or conduit 3 securely in position and holds it substantially perpendicular to the wall of the box, as shown in Fig. 3. If desired, the screw driver may be twisted in the slot 7 so that the width of the slot is increased and the metal thereof pressed against the cable or conduit 3. It will be understood, as indicated above, that in the preferred embodiment, the edge of the aperture is preferably in the form of a spiral; an exact spiral, however, is not necessary to successful operation of the invention.

In making the boxes with the knock-out members 4 in position, the knock-out members may be secured to one or more of the tabs 6 by a small uncut portion of metal 9 and may be completely separated from the other portions of the tabs or substantially cut therefrom. When it is desired to remove the knock-out members, a screw driver may be inserted between the downwardly pressed tab and the underside of the knock-out to pry the knock-out loose, or a hammer or other tool may be used for punching out the knock-out members. The apertures of the present invention may be made with the same degree of ease as they have been made heretofore in existing terminal boxes. The shape of the tools forming the apertures and knock-out members can be changed readily to provide the desired shapes and forms thereof.

A modified form of aperture is shown in Fig. 5, wherein the edge of an aperture 2" is shown in the plane of the wall of the outlet box. A pair of slots 5' provide a bendable tongue 6' having a circumferentially extending slot 7'. After the cable or conduit 3 has been inserted into the aperture 2' a screw driver or other pointed instrument is inserted into the aperture 7' and is twisted to force inwardly the metal which is located between the aperture 2' and the slot 7' until it is in the position shown in dotted lines in Fig. 5 and in secure engagement with the cable. It will be noted that in addition to securing the cable in position, the present invention effectively grounds the cable, which is one of the requirements of fire underwriters.

While the above described aperture constructions are shown in connection with a so-called "BX" cable 3 which has a spiral groove 10 in it, it may also be used with lead pipes or other conduits, such as those illustrated in Figs. 6 and 7.

In certain cases an electrician may have to work from the inside of the box, in which case he does not care to move around to the outside of the box in order to pull outwardly one of the tongues of the box for locking the conduit therein. Therefore, it may be desirable in some instances to provide slots 7 in all three of the tongues so that a workman may pull inwardly one of the tongues from the inside of the box, rather than move around to the outside of the box to pull outwardly the slotted tongue. With such a construction a workman may operate from the inside as well as from the outside of the box.

In some instances, thin wall pipes 15 are used for conduits; their external diameters are less than those of thick wall pipes. In other instances, the apertures of a terminal box may be larger than the pipes or conduit. To accommodate situations of this character there is shown, in Fig. 6 of the drawing, a tapered sleeve 12 with a threaded exterior 13 adapted to be inserted into an aperture to engage with the edges thereof. The interior of the sleeve 12 has a cylindrical portion 14 adapted to receive a pipe or conduit 15. Preferably the tapered threaded portion 13 of the sleeve 12 is slotted longitudinally or spirally as shown at 16. One of the slots 16 preferably extends the entire length of the sleeve as shown, the others terminate at the end of the threaded part. The pipe 15 may be inserted into an aperture and the sleeve 12 passed over its end from the interior of the box. As the sleeve 12 is screwed into an aperture 2, the tabs 6 of the box engage the threads 3 of the outer surface of the sleeve. The slots 16 permit the sleeve to contract about the pipe and hence hold it securely in position. The sleeve 12 is preferably made for application to the preferred form of apertures described herein. However, good results can be obtained by application of the sleeve to present types of apertures, the sleeve being permitted to form its own thread. In some cases, the electrician may prefer to force the sleeve into position by axial pressure. This may be done with the preferred form of aperture or with the usual forms of apertures. The ridges on the sleeve cooperate with the slots to provide a ratchet effect, to hold the sleeve in effective position. The inside of the sleeve 12 preferably has annular ridges or irregularities 23 which bite into the conduit to hold it securely in position.

In Figs. 7 and 8 a different form of nut or sleeve 12' is utilized for securing a conduit or pipe 15' in position. The pipe in this instance may be substantially the same size as the aperture or it may be smaller than the aperture. The sleeve 12' has a spiral formed from a separate coiled wire 18 secured thereto which serves the purpose of a ring thread. The inwardly and outwardly projecting tabs 6 form a female thread into which the coiled wire 18 of the sleeve 12' may be screwed. In order to constrict the spiral wire 18 about the pipe 15' to lock it in position, a series of outwardly projecting tabs 20 are provided, which taper inwardly. As the sleeve 12 is screwed into position, these tabs constrict the spiral 18 to lock it securely in position about the pipe 15. The spring forms grooves in the conduit, since the latter is made of soft metal, thereby locking it securely in position.

In the manufacture of the outlet boxes 1, the present commercial forms of boxes may be utilized. The tools for forming the apertures and knock-out members are changed sufficiently so that the edges of the apertures, after the knock-out members are removed, are in substantially the form of a spiral. In using the boxes, an electrician prys or knocks out the members 4, leaving the aperture as shown more particularly in Figs. 2, 3, and 4. Thereafter, a conduit, for example, a "BX" cable, may be inserted into the aperture by inclining it to the wall of the box, as shown in Fig. 3. When it is sufficiently far into the box a screw driver or other pointed instrument is utilized to bend back one of the tabs to lock the cable in position. At the time the tab is bent back, the inner periphery adjacent the slot 7 may also be bent or distorted to further lock the cable in position, as shown in Fig. 5. With the aperture illustrated in Fig. 5 the locking is secured primarily by distorting the metal intermediate the slot 7' and the aperture 2'. In the operation of the device illustrated in Fig. 6, a conduit 15 is inserted into the aperture and the sleeve 12 is telescoped about the conduit and into the aperture 2. Thereafter rotation of the sleeve 12 screws the sleeve into the aperture 2 due to the thread 13 on the exterior surface of the sleeve. As the tapered sleeve moves into the aperture, it is forced to contract about the conduit 15 and hence locks it in position. A different sleeve is shown in Fig. 7 which operates on the same general principle; inwardly tapered projections 20 constrict the spiral 18 securely to lock or clamp the pipe in position.

It will be seen that the present invention provides an improved outlet or connection box. A cable or conduit may be secured in the apertures of the box in less time and more effectively than with previous boxes. The usual clamps are eliminated. An inspector is able to readily see whether or not the cable or conduit is securely locked in an aperture. Since the locking is visible from the exterior of the box there is little likelihood of a workman failing to complete his work. No additional material or labor is required in the manufacture of the boxes and they can be sold at the same prices as existing boxes. The amount of time saved by utilizing the present improved box for wiring is substantial and the results achieved are much more desirable. The device is simple in construction and operation and is suitable for all the requirements of present commercial wiring.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an outlet or junction box of the class described, the combination of a wall made of sheet metal, said wall having an aperture therein, and a knock-out member secured to the edge of said aperture, a portion of the periphery of said aperture being bent out of the plane of said wall and having an aperture therein, whereby a cable or conduit may be secured in position by inserting a tool in said aperture and bending said portion of the periphery of the aperture back toward its normal position.

2. In an outlet or junction box of the class described, the combination of a wall made of bendable sheet material, said wall having an aperture therein, a knock-out member secured to the edge of said aperture, a slot adjacent the periphery of said aperture and spaced therefrom by a relatively bendable strip whereby an instrument may be inserted in said slot to bend said strip into locking engagement with a conduit in the aperture.

3. In an outlet or junction box of the class described, the combination of a wall made of bendable sheet material, said wall having an aperture therein, a slot adjacent the periphery of said aperture and spaced therefrom by a relatively thin bendable strip whereby an instrument may be inserted in said slot to bend said strip into locking engagement with a conduit in the aperture.

4. In a box of the class described, the combination of a wall made of sheet metal, said wall having an aperture therein, a plurality of slits extending outwardly from the periphery of the aperture, the peripheral portions intermediate the slits being bent into different planes to form screw projections substantially spirally arranged, one of said members formed by the slits having a slot therein, whereby a pointed instrument may be inserted into the slot to bend it into locking engagement with a cable in the aperture.

5. In an outlet or junction box of the class described, the combination of a wall, said wall having an aperture therein, slots in the periphery of said aperture forming a plurality of bendable tongues, one of said tongues being bent out of the plane of said wall to permit a cable larger than the normal size of the aperture to be inserted in the aperture by being held at an acute angle to the plane of the wall, said bent tongue having an aperture therein to facilitate the insertion of a tool for bending the tongue into interlocking engagement with the cable.

6. In an outlet box of the class described, the combination of a wall having an aperture therein, portions of the periphery of the aperture being bent out of the plane of the wall to provide screw means, a sleeve having a spiral member secured thereto for threaded engagement with said aperture, and projections about the periphery of the aperture tapered inwardly to force said spiral member into secure engagement with a conduit extending through the sleeve.

7. In an outlet box of the class described, the combination of a wall having an aperture therein, portions of the periphery of the aperture being bent out of the plane of the wall to provide screw means, a sleeve having a constrictable portion with spiral ridges thereon adapted to be threaded into said aperture to secure a cable therein, and projections about the periphery of the aperture tapered inwardly to force said constrictable portion into secure engagement with a conduit extending through the sleeve.

8. In an outlet or junction box of the class described, the combination of a wall made of bendable material, said wall having an aperture therein, a slot adjacent the periphery of said aperture and spaced therefrom by a bendable strip, whereby an instrument may be inserted in said slot to bend said strip into locking engagement with a member extending through the aperture.

OSWIN C. MOLL.